United States Patent [19]

Stockburger et al.

[11] Patent Number: 4,621,188

[45] Date of Patent: Nov. 4, 1986

[54] DATA CARD AND DATA STRIP MEASURING MEANS

[76] Inventors: Hermann Stockburger, Kirnachweg 7, D-7742 St. Georgen; Hans-Georg Winderlich, Niedere Str. 36, D-7730 Villingen, both of Fed. Rep. of Germany

[21] Appl. No.: 697,425

[22] Filed: Feb. 1, 1985

Related U.S. Application Data

[63] Continuation of Ser. No. 539,186, Oct. 5, 1983, abandoned, which is a continuation of Ser. No. 232,040, Jan. 30, 1981, abandoned.

[51] Int. Cl.⁴ .............................................. G06K 19/00
[52] U.S. Cl. ................. 235/382; 340/825.34; 235/487
[58] Field of Search ............... 235/382, 487, 488, 493; 340/825.31, 825.34

[56] References Cited

U.S. PATENT DOCUMENTS

| | | | |
|---|---|---|---|
| 3,956,615 | 5/1976 | Anderson et al. | 340/825.34 |
| 4,013,894 | 3/1977 | Foote et al. | 340/825.34 |
| 4,025,760 | 5/1977 | Trenkamp | 340/825.34 |
| 4,186,871 | 2/1980 | Anderson et al. | 340/825.31 |
| 4,423,415 | 12/1983 | Goldman | 340/825.34 |

*Primary Examiner*—Donald J. Yusko
*Attorney, Agent, or Firm*—Donald Brown

[57] ABSTRACT

In a data transmission system comprising at least one data bank, data may be accessed through a subscriber station. First data should only be accessed by a first authorized range of subscribers, while other data may only be accessed by a second authorized range of subscribers. To this end, the subscriber station includes a reading device enabling data access only if data read from an authorization card to be supplied fulfill predetermined test conditions.

3 Claims, 3 Drawing Figures

FIG. I

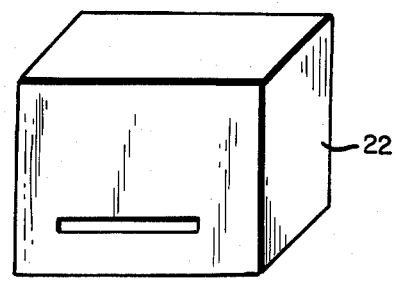
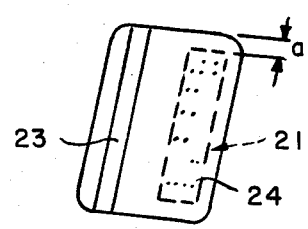
FIG. 2
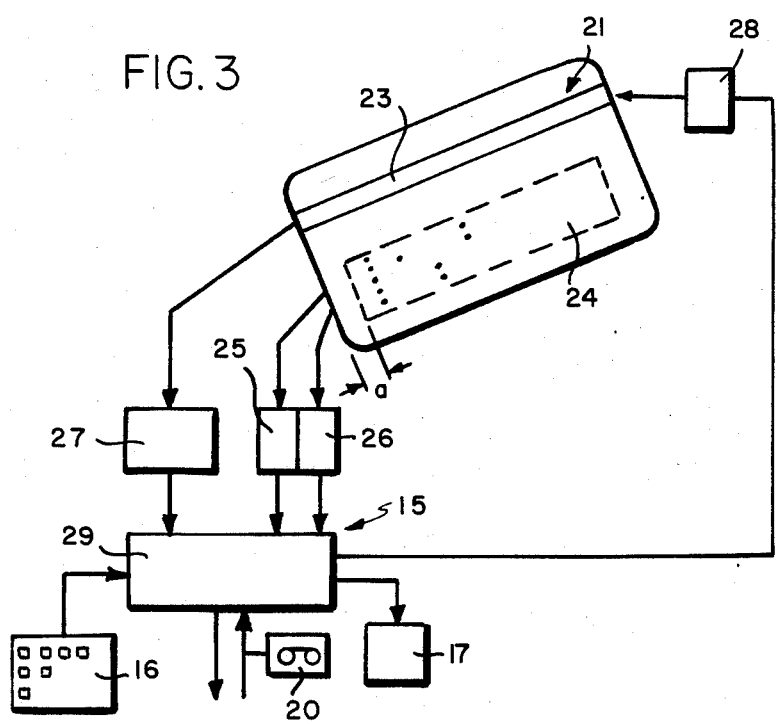
FIG. 3

DATA CARD AND DATA STRIP MEASURING MEANS

This application is a continuation, of application Ser. No. 539,186, filed Oct. 5, 1983, which is a continuation of Ser. No. 232,040, filed Jan. 30, 1981, both abandoned.

The invention relates to a data transmission system comprising at least one data bank and one subscriber station through which the data may be obtained from the data bank.

It is known to connect subscriber stations to a central data bank, e.g. through telephone connections, and to establish communication in this way between the subscriber station and a data bank. The subscriber station may be equipped with a display screen for example or with a printer in order to display the transmitted data.

A problem is raised by the fact that certain data of a data bank should normally be made accessible only to a selected range of subscribers, whereas other data, for example the status of a bank account, should only be obtained by a single subscriber. Further, a decisive fact for the authorization of accessing data may be the question whether the subscriber concerned has paid a tax.

It is known from selling and service machines to use authorization cards which are inserted into the machine and first checked by the same as to authenticity. These authorization cards may also be used as payment cards representing a determined value of money. When a machine is used, the credit registered on the card is reduced by the selling price, and the new credit amount is subsequently registered.

It is the object of the invention to provide a data transmission system of the kind mentioned at the outset in which the subscriber stations are protected against non-authorized use.

To achieve this object, in accordance with the invention, the subscriber station is provided with a reading device for mechanically reading the authorization cards and for enabling data access only in case an authorization card is presented fulfilling predetermined test conditions.

In this way, for one thing, it will be assured that only those persons having an authorization card will be allowed to access the data bank. Use of the authorization card can be registered by cancellation thereof so that one authorization card will only permit a limited number of uses of the data bank.

A particular problem is raised by securing information contained in a data bank against non-authorized access. In order to achieve this security, in accordance with an advantageous embodiment of the invention, the authorization cards may bear individual characterizing information which is detected by the reading device and supplied to a computer provided at the subscriber terminal and to the data bank. The data bank includes an encoder for mixing the useful information delivered by the data bank with the characterizing information by reversible combination, and the computer will restore the useful information from the information mixture through an inverted combination.

At the same time, on the side of the data bank, there will be a selection feature to assure that the subscriber will only be permitted access to those data he is allowed to obtain in accordance with his characterizing information. Not only the accessing subscriber will be registered at the data bank in accordance with his characterizing information, but the characterizing information will additionally provide information about the scope of authorization. Finally, the characterizing information will be useful for another purpose. In fact, the encoder combines the same with the useful information in accordance with a predetermined combination or function, so that a data mixture consisting of the useful information and the characterizing information will be transmitted to the subscriber, rather than the genuine information. The functions in accordance with which the coding and decoding of the data mixture will be perfomed are stored or wired within the computer or encoder.

In order to obtain the data requested from the data bank. the user will have to perform a decoding operation at the subscriber station. Thus, non-authorized persons can not obtain the data by tapping or "monitoring". Preferably the data transmission system will operate using the public telephone network. In this case, any telephone subscriber may be given the possibility, to receive data from the data bank and supply data to the data bank with a corresponding equipment and using an authorization card.

In this way, it will be possible to receive general knowledge, literature, topical information, etc. from the data bank. In addition, department stores, banks and mail order houses may be connected. For example, the subscriber can be informed by dialling the computer of an airline company whether a predetermined flight is booked-out. If this is not the case, he may proceed with the booking, and in this case, a suitable data input device in the form of a keyboard will be required at the subscriber station. Further, money transfer orders may be performed in this way. In any case, the data will be transmitted in coded form, the transmitted data being modified by the characterizing information.

In order to achieve increased security against improper use of the authorization card, the authorization card may enable data supply to and data delivery from the data bank only in case a predetermined identity number is additionally introduced at the subscriber station through the keyboard. In this way, an improper use of the authorization card is practically impossible (even if lost or stolen).

The encoder and the computer may be embodied in such a way that they perform interdigitation or the reverse operation of the bits of the characterizing information with the bits of the useful information. The bits of the characterizing information are distributed at predetermined positions between the bits of the useful information so that none of the two may be selected from the mixture signal without knowing the rule of interdigitation.

A still improved mode of coding which is still safer against non-authorized decoding is achieved by embodiments of the encoder and computer which perform an algebraic combination or a reverse operation of the characterizing information and the useful information. In the simplest case, the combination may be an adding or substracting operation.

In order to protect the authorization card against impropr imitation, it preferably contains two information groups which may be separately read and supplied to the computer. The first information group may be allotted to the card and be invariable, whereas the second information group may consist of an information mixture of data corresponding to the first information and variable data. For example, the account status of the card proprietor's account or the date of the last use of the card may be registered as the variable data. These variable data are mixed with the data allotted to the card. The data allotted to the card are parameters which are different from one card to another, for example the position of an optical mark on the card, an individual card number etc.

In accordance with an advantageous embodiment of the invention, the relationship of the encoder for combining the characterizing information with the useful information is the same relationship for combining the first information group with the variable data on the card. In this case, the computer may both proceed with checking the card as to authenticity and decode the data supplied by the data bank. The characterizing information of the card corresponds at least in part to the first information group, but additionally may comprise further signals.

An embodiment of the invention will hereunder be disclosed in detail with reference to the drawings.

In the drawings:

FIG. 2 shows a card reading device and a card at a subscriber station; and

Figure 1:
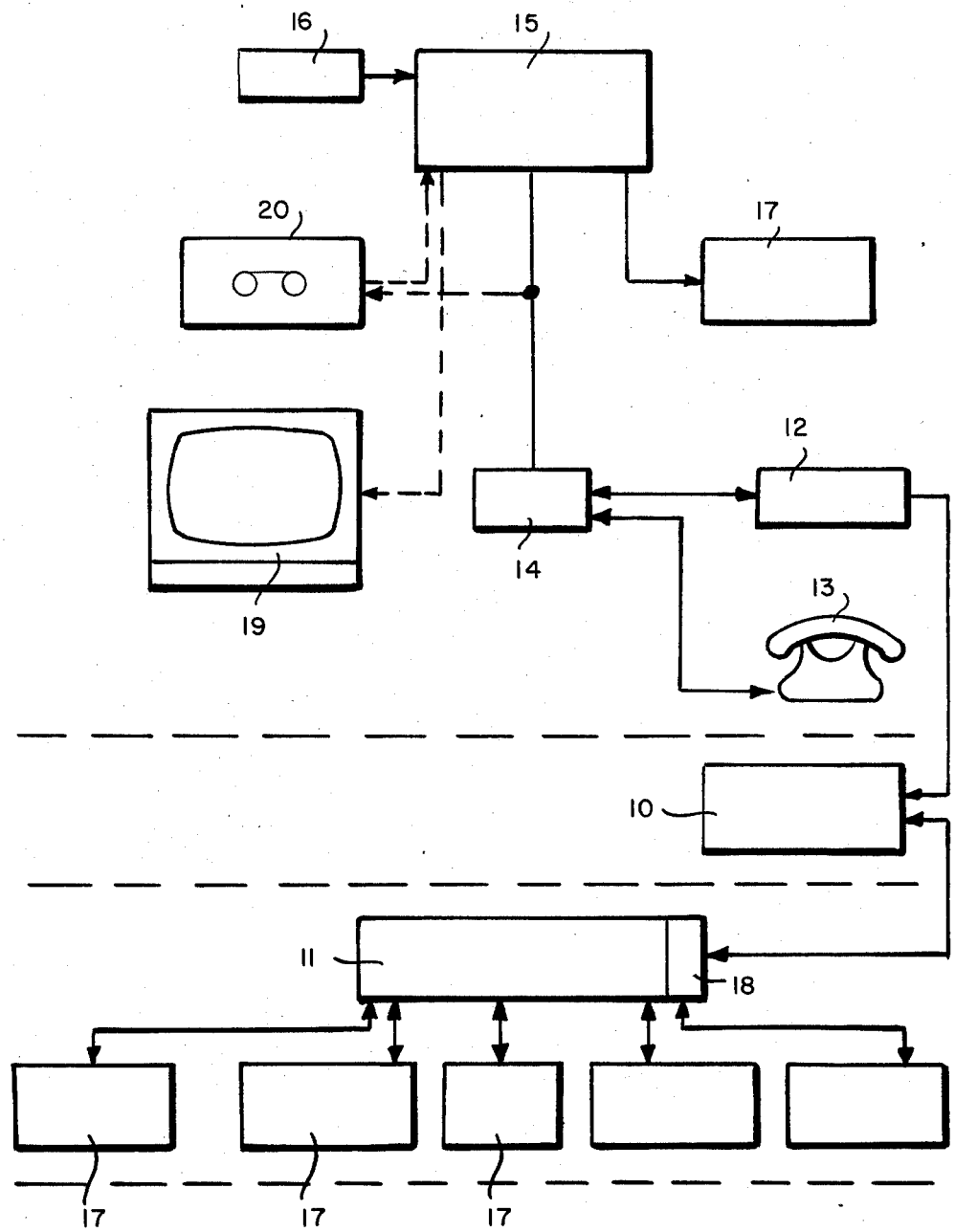
FIG. 1 shows a lock diagram of the data transmission system.

FIG. 3 a block diagram of the information path at the subscriber station.

In accordance with FIG. 1, a data bank 11 in the form of a central computer is connected to the public telephone network 10. To each telephone subscriber terminal 12 to which a telephone 13 is connected, a subscriber station 15 is connected in addition through a coupling device 14. The latter is connected with a keyboard 16 and a printer 17.

The data bank 11 may access a plurality of memories 17 in which accessible data of banks, travelling agencies, department stores, records etc. are stored. However, these data are not directly supplied to the telephone network by the data bank, but rather in coded form. In order to achieve this, an encoder 18 is located at the output of the data bank.

In order to visualize the data supplied to the subscriber staion, a display terminal 19 may be connected to the subscriber station. A magnetic tape recorder is used for recording the coded data and is connected to the coupling device 14.

The subscriber station 15 is rendered operative by inserting an authorization card 21 into a card reading device 22 (FIG. 2). The authorization card 21 is provided with a longitudinal information track 23 of magnetizable material and a punched strip 24 inserted between two card layers and bearing a series of information allotted to the card. The punched strip 24 is shorter than the card length so that its position in longitudinal direction of the card may be changed. Upon production of the cards, care is taken to achieve a variable position of the punched strip on the card in longitudinal direction thereof so that the distance a of the front edge of the punched strip from the front edge of the card is one of the individual features of the card. This distance is detected by the card reading device 22 in addition to the binary information contained on the card. Alternately, the distance of the first series of perforations of the punched strip from the front edge of the card may be detected. Detection of the punched strip 24 within the card is performed by the reading device 25 with appropriate radiation to which the card material is transmissive, the punched strip. however, is opaque. The distance detecting device 26 detects the distance a of the front edge of the punched strip from the front edge of the authorization card. The content of the magnetic track 23 is read by reading head 27, while the recording of the magnetic track 23 is performed with pulses by the magnetic writing head 28.

The magnetic track 23 bears the variable information (useful information) which may be erased and eventually be recorded again in modified form, and which, in addition, is related to the characterizing function of the specific card by an arithmetic function. Thus, the magnetic track 23 contains a mixed information from which the variable information may be filtered only by performing a reverse combination. The characterizing information of the card consists of a perforated pattern at a predetermined position of the punched strip 24 and additionally of the distance a. In the computer 29, a suitable uniquely defined reversible arithmetic function is established by which variable information is combined with the characterizing information of the card in order to achieve the coded mixed information to be recorded on the magnetic track 23. When the mixed information read by the reading head 27 is decoded with the above mentioned arithmetic function, the characterizing function will be obtained which must correspond with the characterizing function read by the devices 25 and 26 in order to acknowledge the payment card as being authentic. The communication with the data bank will only then be permitted.

The subscriber may direct requests to the data bank through the keyboard 16 or deliver information thereto. In the computer 29 the bits generated by the keyboard are combined with the characterizing information of the card. This combination is defined by the same arithmetic function as the combination of the variable date of the card with the characterizing information. The data of the keyboard 16 are also being delivered to the encoder 18 of the data bank 11 in coded form.

The encoder 18 is basically formed as the computer 29 of the subscriber station. The encoder 28 and the computer 29 contain the same arithmetic combination function. At the beginning of a communication between a subscriber station and the data bank, the characterizing information of the authorization card is supplied from the subscriber station to the encoder 18 so that the encoder 18 is then enabled to decode the mixed information from the suscriber station in a manner allotted to the card.

Data requested from the data bank 11 are coded in the same way by the encoder 18, i.e. with the rpedetermined coding function and taking into account the characterizing information of the authorization card. In this way, mixed data are supplied to the subscriber station 15 which cannot be decoded without knowledge of the coding function and the characterizing information of the respective card. This mixed information can be decoded at the subscriber station 15 and subsequently supplied to the printer 17 in order to print the useful information in decoded form. The mixed information may be directly supplied to a magnetic recording device 20 to be recorded thereby. The record made by the recording device 20 may not be accessed without the subscriber station 15 and without the characterizing information of the respective card, so that the content of the recording device 20 is safe against non-authorized extraction. When the content of the recording device 20 is to be visualized, the subscriber station 15 must be put in operation using the authorization card, so that decoding of the recorded mixed information and display of the decoded useful information may be achievd on the display screen 19. The system disclosed offers substantial security of the subscriber station against improper use by third persons, e.g. by improper operation. By coding or interdigitation of the useful information with characterizing information allotted to the subscriber, the information transmission path is secured. The access to personal discrete data from the data bank by non-authorized persons is impossible. The invention allows the establishment of public subscriber systems for a self-service telecommunication system with tax payment by payment card systems. For example, the variable information contained on the authorization card may represent an account status corresponding to the selling price of the authorization card. Each time the data bank is used, the account status or credit recorded on the authorization card is reduced. Further, a uniquely defined identification of the data bank user is rendered possible by the characterizing information so that the settlement with respect to the using tax may also be made separately. The substantial security of the data tansmission agains improper use offers the possibility to perform business by using the system, e.g. obliging bookings, ordering or sellings.

We claim:

1. A system comprising an authorization card having track of magnetizable material having information stored therein, a strip having information allocated to the card, said strip being shorter than the card length and said strip having an edge a distance a away from an edge of the card, means for measuring the distance a of said edge of said strip away fom the edge of the card, and means for reading the information content of said strip and said track.

2. A system comprising an authorization card having a track of magnetizable material, a strip having a plurality of punched out areas allocated to the card, said strip being shorter than the card length and said strip having an edge a distance a away from the edge of the card, means for measuring the distance a of said strip away from an edge of said card, and means for detecting punched out areas in the strip, and means for reading the information in the magnetizable strip.

3. A card having a track of magnetizable material, a strip of material having a plurality of perforations as information allocated to the card, said strip being shorter than the length of the card from edge to edge and an edge of the strip being a distance a from an edge of the card, and a magnetizable track having stored thereon information which is dependent on and related to the information allocated to the card stored as perforations and the distance a.

* * * * *